(12) United States Patent
Schaffran et al.

(10) Patent No.: US 6,563,761 B1
(45) Date of Patent: May 13, 2003

(54) APPARATUS AND METHOD OF VEHICLE OCCUPANT SENSING USING MULTIPLE ULTRASONIC FREQUENCIES

(75) Inventors: Michelle R. Schaffran, Jersey City, NJ (US); Dale W. McKim, Howell, MI (US); Stephen R. W. Cooper, Fowlerville, MI (US); Edward J. Gillis, South Lyon, MI (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/704,995

(22) Filed: Nov. 2, 2000

(51) Int. Cl.[7] .................. G01S 15/08; G01S 15/88
(52) U.S. Cl. .................. 367/101; 367/99; 280/735; 701/47
(58) Field of Search ............... 280/735; 367/99, 367/101; 701/45, 47

(56) References Cited

U.S. PATENT DOCUMENTS

| | | | |
|---|---|---|---|
| 3,019,430 A | 1/1962 | Pedersen et al. | |
| 4,259,734 A | 3/1981 | Harmel | |
| 4,282,589 A | 8/1981 | Evetts et al. | |
| 4,405,829 A | 9/1983 | Rivest et al. | |
| 4,516,226 A | 5/1985 | Peynaud et al. | |
| 4,758,997 A | * 7/1988 | Nelson | 367/49 |
| 4,807,202 A | 2/1989 | Cherri et al. | |
| 4,905,207 A | 2/1990 | Fellinger et al. | |
| 5,330,226 A | 7/1994 | Gentry et al. | |
| 5,436,838 A | 7/1995 | Miyamori | |
| 5,454,720 A | 10/1995 | FitzGerald et al. | |
| 5,653,462 A | * 8/1997 | Breed et al. | 280/735 |
| 5,663,930 A | 9/1997 | Capell, Sr. et al. | |
| 5,670,853 A | 9/1997 | Bauer | |
| 5,673,932 A | 10/1997 | Nitschke et al. | |
| 5,702,123 A | 12/1997 | Takahashi et al. | |
| 5,742,506 A | 4/1998 | Kura et al. | |
| 5,790,068 A | 8/1998 | Musbach et al. | |
| 5,901,978 A | 5/1999 | Breed et al. | |
| 5,904,368 A | 5/1999 | Blackburn et al. | |
| 5,906,393 A | 5/1999 | Mazur et al. | |
| 5,943,295 A | 8/1999 | Varga et al. | |
| 6,007,095 A | * 12/1999 | Stanley | 280/735 |
| 6,104,671 A | 8/2000 | Hoyt et al. | |
| 6,302,438 B1 | * 10/2001 | Stopper, Jr. et al. | 280/735 |

OTHER PUBLICATIONS

Pending U.S. Cooper et al. patent application Ser. No. 09/704,851, filed Nov. 2, 2000, entitled Apparatus and Method of Distance Determination Using Controlled Emission for Occupant Position Sensing Attorney Docket No. TRW(TE)4592.

* cited by examiner

Primary Examiner—Ian J. Lobo
(74) Attorney, Agent, or Firm—Tarolli, Sundheim, Covell & Tummino L.L.P.

(57) ABSTRACT

An apparatus (20) determines a vehicle occupant location characteristic. The apparatus (20) includes at least one sensor (e.g., 46) for echo ranging at first and second ultrasonic frequencies. A timer function portion (84) of a microcomputer (66) determines a time-of-flight for each frequency signal. The microcomputer (66) determines the occupant location characteristic using at least one of the determined times-of-flight.

12 Claims, 6 Drawing Sheets

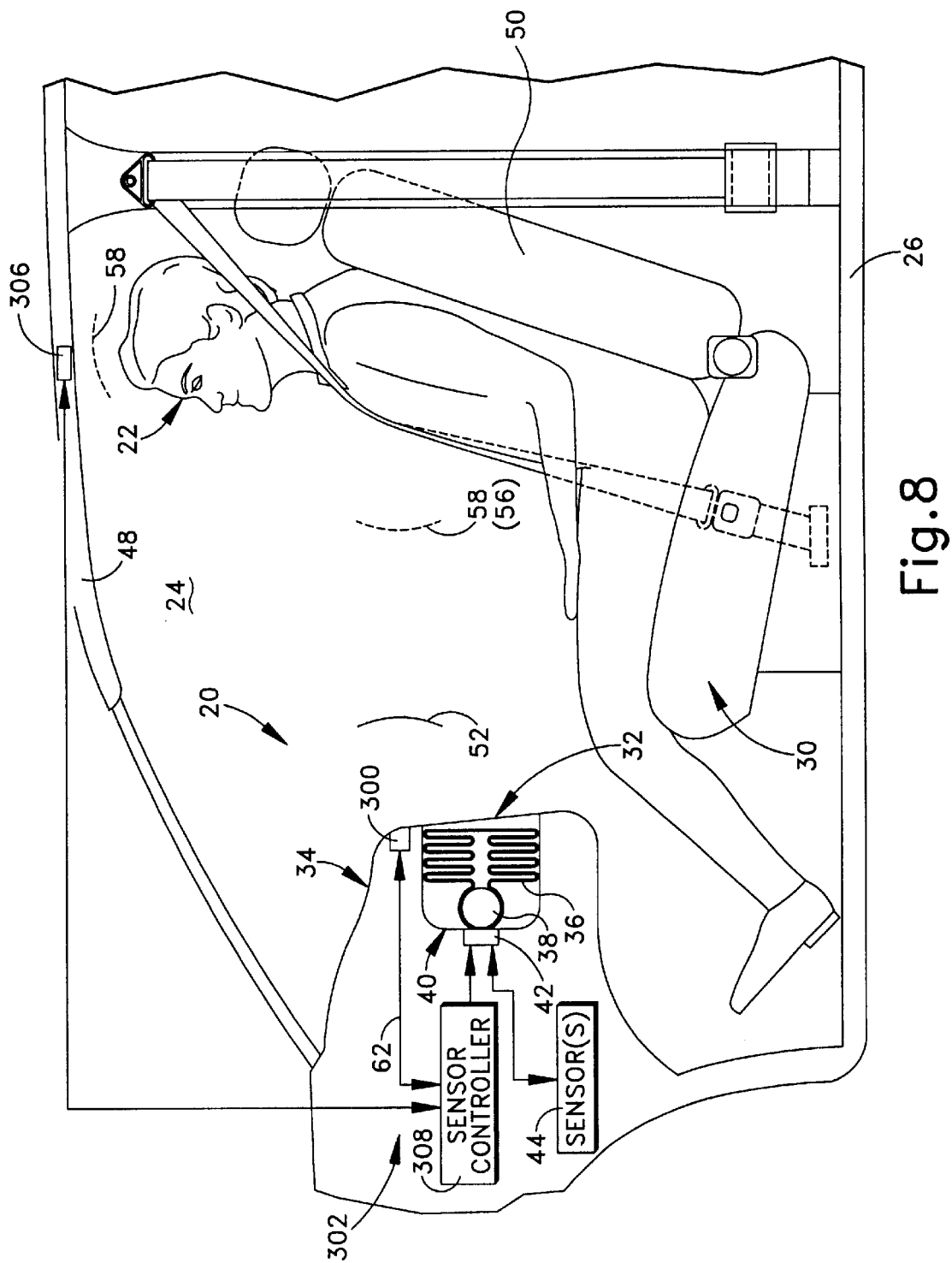

APPARATUS AND METHOD OF VEHICLE OCCUPANT SENSING USING MULTIPLE ULTRASONIC FREQUENCIES

FIELD OF THE INVENTION

The present invention relates to improvements in echo ranging vehicle occupant location sensing.

BACKGROUND OF THE INVENTION

Within a vehicle occupant protection system, it is known to control (e.g., adjust) an inflation profile of an air bag based upon a distance between a vehicle occupant and the air bag to enhance protection of the occupant. Such control is suitable for a scenario in which the distance between the occupant and the air bag assembly changes during a pre-crash braking condition. Specifically, during a pre-crash braking condition, the vehicle decelerates and the inertia of the occupant causes the occupant to move forward relative to the seat toward an instrument panel that contains the air bag assembly. Also, it is known to control other air bag deployment aspects based upon the distance between the occupant and the air bag assembly and/or another occupant location characteristic to enhance protection of the occupant.

A known vehicle occupant protection system includes an echo ranging system to determine the distance between the air bag and the vehicle occupant. An echo ranging system operates by emitting a short burst of a carrier signal that travels directly between an emitter and the vehicle occupant. The emitted signal bounces on the vehicle occupant and the bounced signal returns to a receiver as an echo of the emitted signal. The echo ranging system includes a time-of-flight distance determination system that determines the time elapsed between the emission of the signal from the emitter and the return of the echo at the receiver and from this time differential determines the distance between the occupant and the air bag assembly.

Ideally, the time period between signal emission and echo reception is long enough to allow the signal to travel to the occupant and return before the emission of a subsequent signal. However, if the occupant is located sufficiently far away, then the return echo returns after a subsequent signal is emitted. Such a return echo can be termed a late echo. Also, although it is intended to bounce the signal on the vehicle occupant, it is possible that the signal may bounce on other surfaces within the vehicle. This situation occurs if the occupant turns or leans and the signal bounces on the occupant's seat, on the back seat, or on other surfaces within the vehicle. Such other surfaces may also be located sufficiently far to cause return of a late echo.

The result is that the time-of-flight distance determination system may calculate the time interval between the subsequent emitted signal and the receipt of the return echo (i.e., late echo) associated with the prior emitted signal and thereby miscalculate the distance to be closer than actuality. Therefore, the occupant protection system would not provide optimum enhancement of occupant protection.

One particular type of echo ranging system includes a head unit that incorporates three ultrasonic transmitters and three ultrasonic receivers for emitting and receiving ultrasonic signals. The invention provides for a method of differentiating between ultrasonic signals generated from transmitters physically separated from each other so that a receiver can identify the source of each ultrasonic signal that is received.

Another type of echo ranging system is a system that locates the occupant by emitting and receiving ultrasonic signals using two or more ultrasonic transducers. These transducers are located in various locations in the vehicle passenger compartment. As a result, by implementing multiple transducers and by placing each transducer in a different location, each transducer receives the return signal associated with the signal that each individual transducer emitted.

SUMMARY OF THE INVENTION

In accordance with one aspect, the present invention provides an apparatus for determining a vehicle occupant location characteristic. The apparatus includes means for echo ranging at a first ultrasonic frequency to determine a first time-of-flight to an occupant seating position. The apparatus includes means for echo ranging at a second ultrasonic frequency to determine a second time-of-flight to the occupant seating position. The apparatus also includes means for determining the occupant location characteristic using at least one of the determined times-of-flight.

In accordance with another aspect, the present invention provides a method of determining a vehicle occupant location characteristic. The method includes echo ranging at a first ultrasonic frequency to determine a first time-of-flight to an occupant seating position. The method includes echo ranging at a second ultrasonic frequency to determine a second time-of-flight to the occupant seating position. The method also includes determining the occupant location characteristic using at least one of the determined times-of-flight.

BRIEF DESCRIPTION OF THE DRAWINGS

Further features and advantages of the present invention will become apparent to those skilled in the art from reading the following detailed description with reference to the accompanying drawings, in which:

FIG. 8 is a schematic diagram of an occupant sensing system in accordance with a third embodiment of the present invention, and shown within an occupant protection system for an associated vehicle.

DETAILED DESCRIPTION OF AN EXAMPLE EMBODIMENTS

Figure 1:
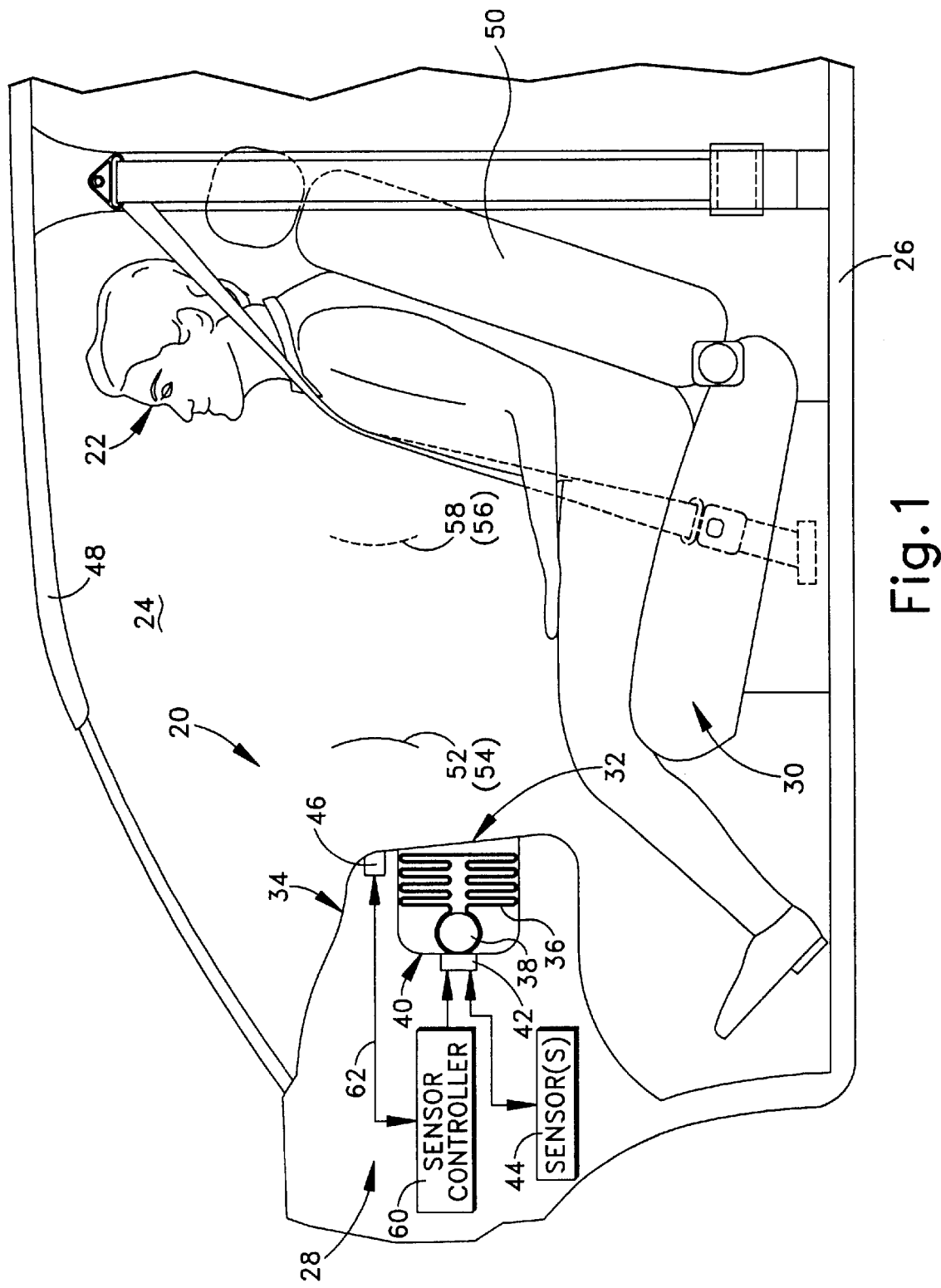
FIG. 1 is a schematic diagram of an occupant sensing system in accordance with a first two embodiments of the present invention, and shown within an occupant protection system for an associated vehicle.

FIG. 1 shows an example of an occupant protection system 20 for protecting an occupant 22 located within a vehicle passenger compartment 24 of an associated vehicle 26. The occupant protection system 20 includes an apparatus 28 for determining an occupant location characteristic in accordance with the present invention.

The occupant 22 is seated on a front vehicle seat 30 within the vehicle 26. Although the embodiments of the occupant protection system 20 and the sensing apparatus 28 set forth herein are related to the front seat 30 of a passenger car and the occupant seating position provided by the front seat, it is to be understood that the invention may be associated with a different seat and/or in a different vehicle.

In the illustrated example of FIG. 1, the occupant protection system 20 includes an actuatable air bag assembly 32 mounted within a dashboard or instrument panel 34 of the vehicle 26. The air bag assembly 32 includes an air bag 36 and a source 38 of inflation fluid (e.g., nitrogen gas). The air bag 36 is folded and stored within an air bag housing 40 compartment, as will be understood by a person of ordinary skill in the art.

Also, the air bag 36 is inflatable within the vehicle passenger compartment 24 of the vehicle 26 via fluid from the inflation fluid source 38 upon actuation of the air bag assembly 32, as will be understood by a person of ordinary skill in the art. An air bag actuation controller 42 of the occupant protection system 20 actuates the air bag assembly 32 to inflate the air bag 36 upon the occurrence of a crash condition for which the occupant is to be protected. The air bag actuation controller 42 utilizes, at least in part, sensory input from at least one sensor 44 to make the actuation determination. For example, the sensor(s) 44 may include an acceleration sensor that outputs a signal indicative of vehicle crash acceleration.

Actuation or deployment of the air bag 36 is adjustable by the air bag actuation controller 42 to enhance protection of the occupant. Inflation timing, inflation pressure, and position of the inflated air bag 36 are example adjustable aspects of the air bag deployment. Also, complete suppression of actuation of the air bag 36 is an adjustable aspect. Some examples of these and other adjustable aspects are disclosed in U.S. Pat. Nos. 5,330,226, 5,670,853, and 5,904,368. It is to be appreciated that the type and/or manner of adjustment are not limitations on the present invention. However, in the disclosed example system 20 shown in FIG. 1, the present invention provides at least a benefit of providing information utilized to determine desired adjustment for the air bag 36. Adjustment of the adjustable aspect(s) is related, at least in part, to an occupant location characteristic (e.g., presence, location, type, etc. of the occupant), as determined by the apparatus 28 in accordance with the present invention.

It is to be appreciated that the occupant protection system 20 may include other/different types of occupant protection devices, such as a seat belt pretensioner, a knee bolster, or a side curtain. Further, it is to be appreciated that the present invention may be used for an application other than within an occupant protection system (i.e., another environment). Control/adjustment of such other/different types of occupant protection devices and of such other applications is related, at least in part, to an occupant location characteristic (e.g., presence, location, type, etc. of the occupant), as determined by the apparatus 28 in accordance with the present invention.

Turning to the example of the apparatus 28 shown in FIG. 1, a sensor 46 of the apparatus 28 is mounted on the instrument panel 34, adjacent to the air bag assembly 32. It is to be appreciated that the sensor 46 may be mounted at another location (e.g., on a headliner 48 or on a seatback 50).

The sensor 46 includes an ultrasound transducer that emits and receives signals. Specifically, the transmitted signals are a first signal 52 at a first ultrasonic frequency and a second signal 54 at a second, different ultrasonic frequency. Each signal is comprised of a short burst of a carrier frequency at the respective frequency. It is intended that the first and second ultrasonic signals 52 and 54 reflect from the occupant and result in first and second echoes 56 and 58, respectively, for receipt by the sensor 46. It is to be appreciated that the occupant 22 may be absent, and an inanimate object (e.g., a box) may occupy the seat. In the absence of the occupant, it is intended that the first and second ultrasonic signals 52 and 54 reflect from the object occupying the seat or the seat back and result in first and second echoes 56 and 58, respectively for receipt by the sensor 46.

In FIG. 1, a single ultrasonic signal and a single echo are shown. Specifically, the single signal is primarily identified as the first ultrasonic signal 52 and the single echo is primarily identified as the second echo 58. The single signal is alternatively identified as the second ultrasonic signal 54 and the single echo is alternatively identified as the first echo 56 via the parenthetical reference. The depiction of only the single signal and the single echo with the alternative identifications is to indicate that in a preferred embodiment the first and second ultrasonic signals 52 and 54 are alternately emitted.

Turning back to the illustrated example, a sensor controller 60 of the apparatus 28 is operatively connected 62 to the sensor 46. The controller 60 is also operatively connected 64 to the air bag actuation controller 42. The controller 60 controls the sensor 46 to emit the first and second ultrasonic signals 52 and 54, and receives sensory information from the sensor upon receipt of the first and second echoes 56 and 58. Information derived from the operation of the sensor 46 is accordingly provided to the air bag actuation controller 42.

Figure 2:
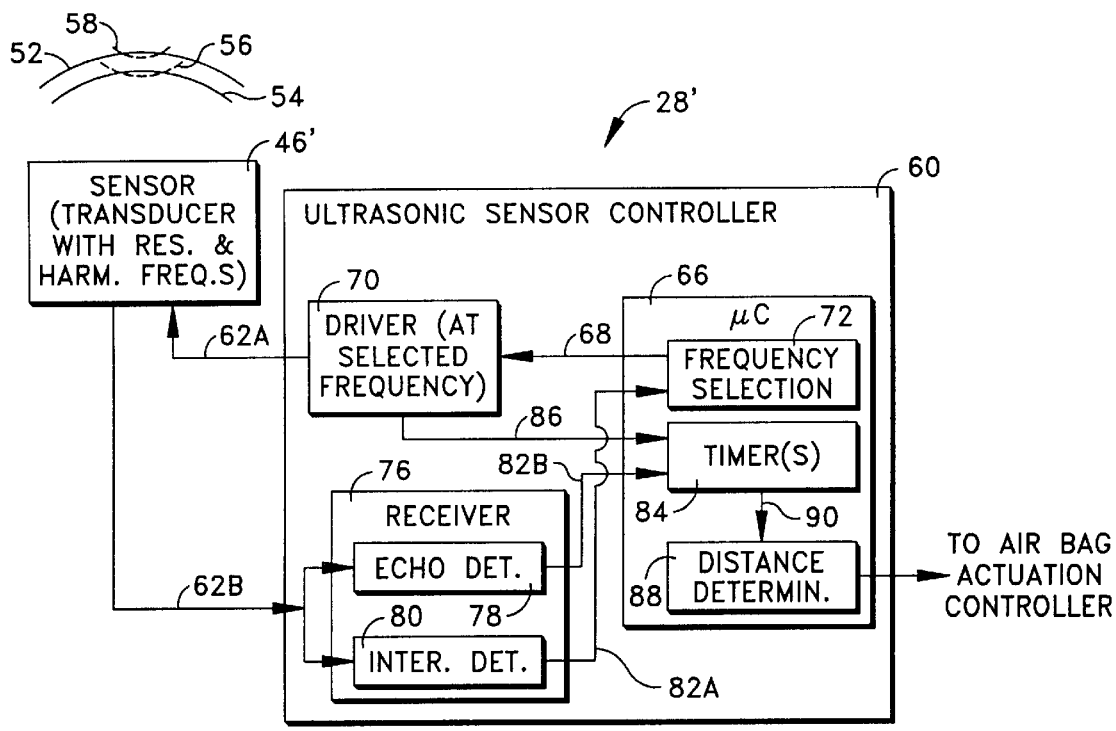
FIG. 2 is a function block diagram of the occupant sensing system of FIG. 1, in accordance with the first embodiment.

A first specific example of the apparatus is shown in FIG. 2, and is designated 28'. Within the controller 60, a microcomputer 66 is operatively connected 68 to a driver 70. It is to be appreciate that the microcomputer 66 may be of any digital or analog type such as an application specific integrated circuit (ASIC), a microprocessor, a micro-controller, or a combination of suitable electronic components.

The driver 70 is operatively connected 62A to the sensor (designated 46') to provide an electrical stimulus signals to the sensor. Each stimulus signal causes the sensor 46' to emit one of the first and second ultrasonic signals 52 and 54. The frequency (i.e., either the first for the second frequency) at which the ultrasonic signal is emitted from the sensor 46' is dependent upon the frequency of stimulus provided by the driver 70. A frequency select function portion 72 of the microcomputer 66 provides the frequency (i.e., either the first or the second frequency) to the driver 70.

Within the sensor 46' the transducer vibrates in response to the electrical stimulus signal from the driver 70. The vibration of the transducer results in the emission of the ultrasonic signals (i.e., the vibration causes ultrasonic sound waves at the stimulus frequency). In the example of FIG. 2, the transducer of the sensor 46' has a single natural resonant frequency that is at the first frequency, and the transducer has a first harmonic frequency that is at the second frequency. Thus, electrically stimulating the transducer at the first frequency is associated with a vibration at the natural resonance of the transducer, and electrically stimulating the transducer at the second frequency is associated with a vibration at the first natural harmonic of the transducer.

The sensor 46' is controlled to emit the first ultrasonic signal 52 (i.e., at the first frequency) and then, after a preset period of time, to emit the second signal 54 (i.e., at the second frequency). The emission of the ultrasonic signals 52 and 54 at a certain rate is referred to as a sensor rate. Preferably, the sensor rate has a period on the order of milliseconds. In one example, the sensor rate is one signal emission per 5 milliseconds.

Impingement of the first and second echoes 56 and 58 also causes the transducer to vibrate. The vibration is translated into an electrical signal. Vibration stimulus of the transducer at the first frequency (i.e., the natural resonance of the transducer) is associated with generation of an electrical response signal at the first frequency, and vibration stimulus of the transducer at the second frequency (i.e., the first harmonic of the transducer) is associated with generation of an electrical response signal at the second frequency.

A receiver 76 of the controller 60 is operatively connected 62B to the sensor 46' to receive the electrical response signals generated at the transducer. Within the receiver 76, an echo detection function portion 78 detects the occurrence of the echoes 56 and 58 for the first and second ultrasonic signals 52 and 54. Attendant with the detection of the echoes 56 and 58, the echoes are identified as being a first frequency echo or a second frequency echo. The receiver 76 also has an interference detection function portion 80 for detecting/monitoring interference on one or both of the first and second frequencies.

The receiver 76, with its echo detection function portion 78 and the interference detection function portion 80, is operatively connected 82 to the microcomputer 66. Specifically, the interference detection function portion 80 is connected 82A to the frequency selection function portion 72 such that determinations regarding interference can be utilized for the control of the stimulus frequency provided by the driver 70 to the sensor 46'.

The echo detection function portion is operatively connected 82B to a timer function portion 84 of the microcomputer 66. The driver 70 is also operatively connected 86 to the timer function portion 84. Each of the driver 70 and echo detection function portion 78 provides a signal to the timer function portion 84 that is used by the timer function portion to determine a timer-of-flight of each ultrasonic frequency signal (e.g., 52/54). Thus, on average within the present example that has a sensor rate of one emission per 5 ms, time-of-flight determinations occur at 5 ms intervals. It is to be appreciated that the driver 70, the receiver 76 with its echo detection function portion 78, and the timer function portion 84 cooperate to match the output of each emitted ultrasonic signal with the reception of the associated echo so that each determined time-of-flight is correct.

A distance determination function portion 88 of the microcomputer 66 is operatively connected 90 to receive the time-of-flight information from the timer function portion 84. Distance determinations are made using known characteristics regarding speed of ultrasonic signal propagation. From the determined time-of-flight (i.e., a time differential between emission and echo reception), the controller 60 calculates a distance between the sensor 46' and the target (e.g., the occupant 22). Specifically, the time between emission of an ultrasonic frequency signal (e.g., 52) and reception of the associated echo (e.g., 56) is divided by twice the propagation speed of the emitted signal to provide the distance to the occupant 22.

Preferably, the distance determination function portion 88 further determines the distance between the air bag assembly 32 and the occupant 22 using an algorithm procedure. Specifically, the distance calculation between the air bag assembly 32 and the occupant 22 is based upon a known distance between the sensor 46' and the air bag assembly 32 and the use of simple geometric relation between the sensor 46' and the air bag assembly 32. The distance determination function portion 88 of the controller 60 then outputs a signal indicative of the distance between the occupant 22 and the air bag assembly 32 to the air bag actuation controller 42, which controls adjustment and deployment of the air bag accordingly.

Figure 3:
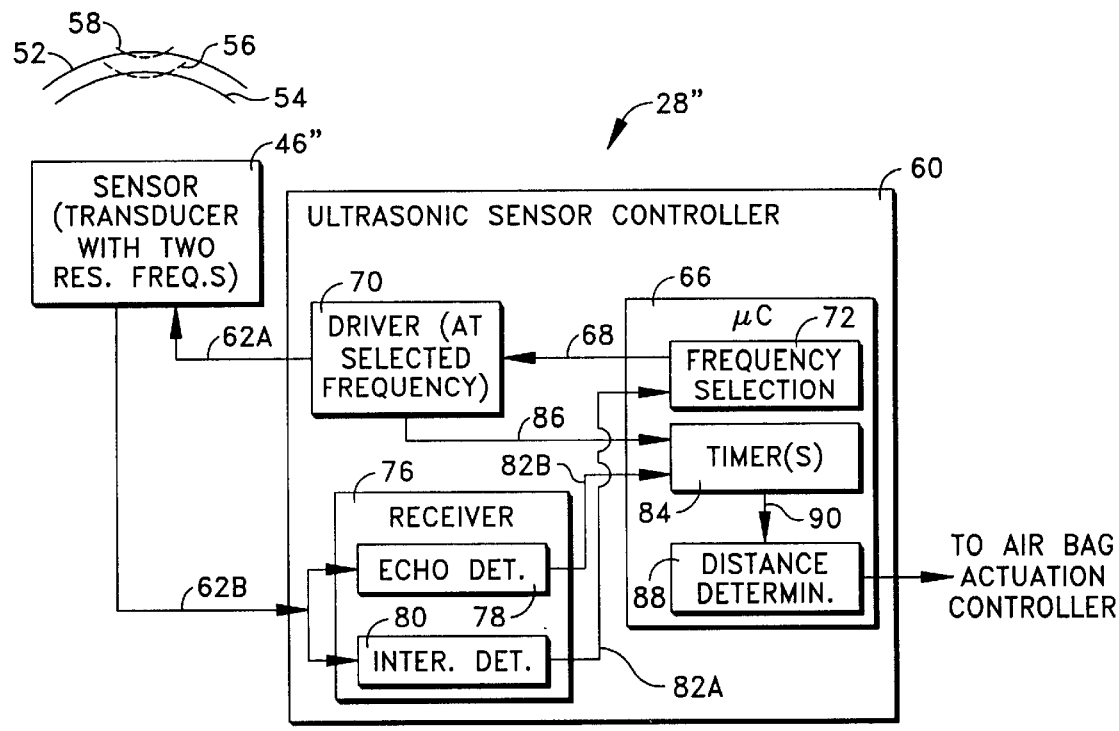
FIG. 3 is a function block diagram of the occupant sensing system of FIG. 1, in accordance with the second embodiment.

Another embodiment of the apparatus is designated 28" and is shown in FIG. 3. It is to be appreciated that the embodiment of FIG. 3 is also represented by the generic designation 28 in the system 20 of FIG. 1. The embodiment of FIG. 3 is similar to the embodiment of FIG. 2, except that the sensor 46' (FIG. 2) is different from the sensor 46" (FIG. 3). Accordingly, identical structural items are identically numbered, and a discussion of the identical items is omitted. Turning to the sensor 46", the transducer of the sensor has two resonant frequencies instead of a signal resonant frequency. The first and second frequencies are at the first and second resonant frequencies, respectively.

Figure 4:
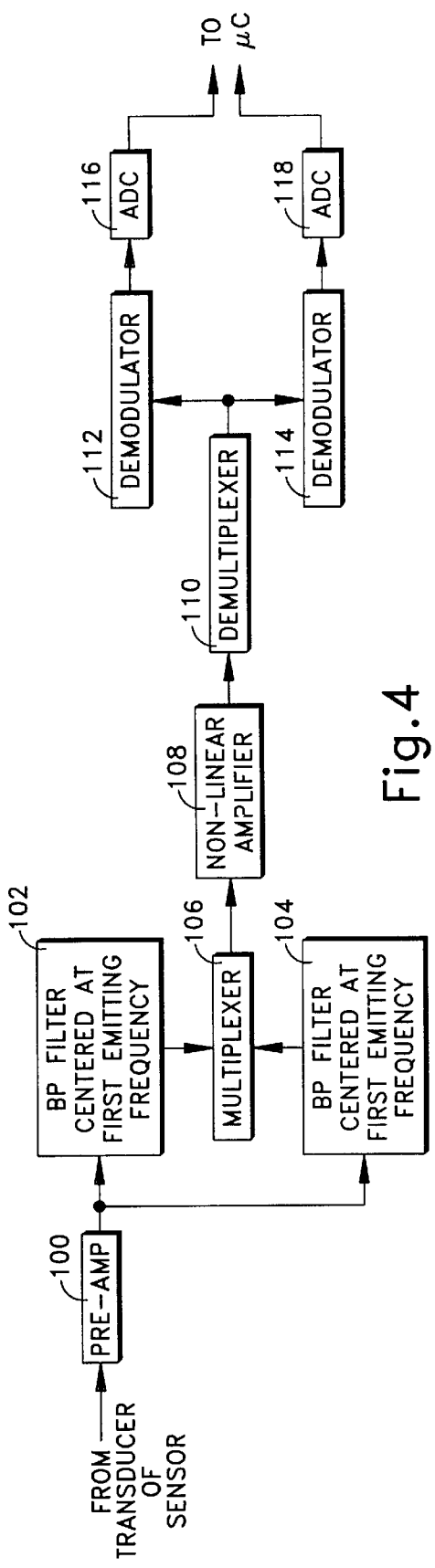
FIG. 4 is a schematic block diagram of a portion of a receiver of the first and second embodiments shown in FIGS. 2 and 3.

Turning to the function of properly identifying return echoes in the first two embodiments, attention is directed to an example of details shown in FIG. 4 for the echo detection function portion 78 of the receiver 76. Upon receipt of each echo (e.g., 56) the sensor (hereafter again referred to generically as 46) produces the electrical signal, and the electrical signal is passed to a pre-amp 100. The pre-amp 100 amplifies the electrical signal to a level that it can sufficiently drive the subsequent circuit elements. The pre-amp 100 outputs an amplified signal to bandpass filters 102, 104, which operate in parallel.

Figure 5:
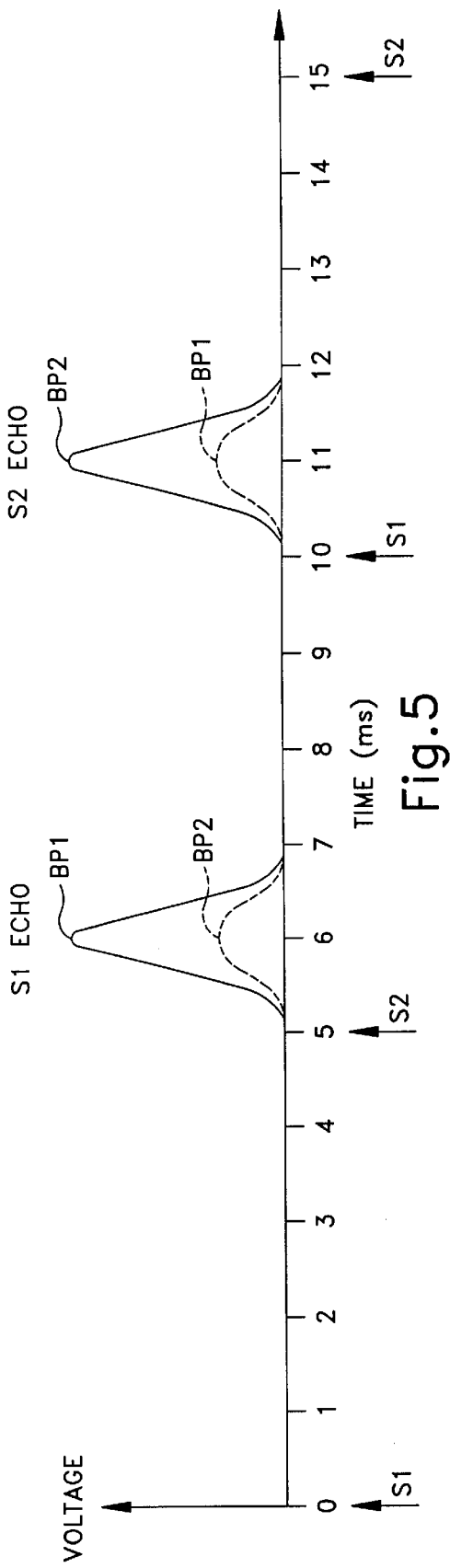
FIG. 5 is an example time plot indicating signal emissions at two frequencies and shows processed results of return echoes.

Each bandpass filter (e.g., 102) passes a band of frequencies centered at one of the first and second frequencies. FIG. 5 illustrates the performance of the two bandpass filter 102 and 104 for reception at the sensor 46 of the first echo 56 and then the second echo 58.

The first bandpass filter 102 (FIG. 4) receives the amplified signal and allows only the portion of the amplified signal that is at the first frequency to pass without a significant reduction in amplitude. A portion of the amplified signal that is at the second frequency is reduced in amplitude to below a certain level by the first bandpass filter 102.

The second bandpass filter 104 receives the amplified signal and allows only the portion of the amplified signal that is at the second frequency to pass without a significant reduction in amplitude. A portion of the amplified signal that is at the first frequency is reduced in amplitude to below a certain level by the second bandpass filter 104.

There are different types of bandpass filters available and many types may be used for the bandpass filter 102 and 104. An example type of bandpass filter is an 8-pole Chebyshev filter that achieves a faster roll-off by allowing ripple (e.g., 0.5%) in the passband.

It is to be appreciated that each bandpass filter 102, 104 can be implemented as one or more filter stages. The bandpass filter stages would be implemented in series, with each series of filter stages being at either the first or second frequency. Each successive bandpass filter stage would output a narrower range of the amplified signal. This would increase the attenuation level between the passbands of the two filters 102, 104 making the invention isolate each signal more effectively.

In an illustrated example, the first signal is emitted at the first frequency set at 58 kHz and the second signal is emitted at the second frequency set at 62 kHz. Accordingly, the first bandpass filter 102 is centered at or has a resonant frequency at 58 kHz and the second bandpass filter 104 is centered at or has a resonant frequency at 62 kHz. The designed attenuation in the first bandpass filter 102 is −3 dB at 59.5 kHz and −19 dB at 62 kHz. This design attenuation ensures that the first bandpass filter 102 passes a signal portion associated with the echo 56 of the first frequency ultrasonic signal 52 and attenuates the signal portions associated with the echo 58 of the second frequency ultrasonic signal 54. On the other hand, the designed attenuation in the second bandpass filter 104 is −3 dB at 60.5 kHz and −19 dB at 58 kHz. This design attenuation ensures that the second bandpass filter 104 passes a signal portion associated with the echo 58 of the second frequency ultrasonic signal 54 and attenuates the signal portion associated with the echo 56 of the first ultrasonic signal 52.

Each bandpass filter 102, 104 is electrically connected to a multiplexer 106 and the output from each bandpass filter is passed to the multiplexer 106. The multiplexer 106 combines the signals and provides a combined output signal to a non-linear amplifier 108. In an example embodiment, the non-linear amplifier 108 is a logarithmic amplifier.

The purpose of the non-linear amplifier 108 is to regulate the dynamic range of the output signals from each bandpass filter 102, 104. Dynamic range regulation is needed to ensure that the signals can later be converted to digital signals without loss of information. For instance, a 10 bit ADC ("analog-to-digital converter") has 60 dB of dynamic range, but the variation in strength of echo ranging signals received from assorted targets can easily have a dynamic range of 100 dB. A non-linear amplifier, such as a logarithmic amplifier, having a 90-dB dynamic range can be combined with a 0 to 30 dB switched gain amplifier. This combination would match a 120-dB dynamic range of a 10 bit ADC. As an alternative, a linear amplifier could be used instead of the non-linear amplifier 108, but operation will be degraded whenever signal amplitude information is lost by having actual signal amplitude either saturate the linear amplifier or fall below a lowest bit of an ADC.

Returning to the illustrated example, the output signal from the non-linear amplifier 108 is passed to a demultiplexer 110. The demultiplexer 110 separates the components from the output signal providing two signals at a first and second frequency, respectively. Both output signals from the demultiplexer 110 are passed to two amplitude demodulators 112, 114 that extract the output signals' amplitude information. Numerous demodulation methods, such as envelope detection demodulation and superheterodyne demodulation are well known in the art and can be employed within the illustrated example. After demodulation, the output signals are provided to two ADCs 116, 118, respectively, where the output signals are converted to two digital signals. The digital signals are provided to the microcomputer 66 (e.g., the timer function portion 84).

Turning to the advantage of the two frequencies, the first and second signals 52 and 54 travel approximately 6.8 inches per millisecond (at room temperature). Thus, each signal can travel out to a target approximately 17 inches away and bounce back to the sensor 46, for a total travel of approximately 34 inches, in 5 ms. Thus, 34 inches is a maximum distance a signal can travel to and from a target without being late. However, alternating the emission of the first signal (at the first frequency) and the second signal (at the second frequency) extends the time period between the emission of two signals at the same frequency.

For instance, with the rate of alternating frequency signal emission set at one signal per 5 ms, a signal at the same frequency is emitted every 10 ms. As illustrated in FIG. 5, if a first frequency signal is emitted at time 0, the next first frequency signal is emitted 10 ms after the first emission. Thus, a signal rate for the same emitting frequency signals is one signal output every 10 ms.

Each return echo has 10 ms to return to the receiver before a subsequent signal at a first frequency is emitted. Thus, even if the return echo is late within the alternating sequence, a distance miscalculation does not occur. The controller 60 associates the late echo with the corresponding emitted signal to avoid signal confusion.

Although alternating signal emission extends the time period to 10 ms between the emission of two signals at the same frequency, the controller 60 is truly receiving echoes 56, 58 of the first and second ultrasonic signals 52, 54 every 5 ms on average. Thus, alternating signal emission every 5 ms provides the controller 60 with significant amount of information to make numerous distance determinations thereby providing optimum enhancement of occupant protection.

In normal operating conditions, the system 20 does not need to work at a high emission rate to update the occupant 22 position. Thus, the emission rate may be varied. For example, the emission rate could be at a first, lower level during routine operating conditions, and the emission rate could be increased to a second, higher level in response to a pre-crash indicative condition. As a result, in situations where the sensor senses a return echo that bounces on other surfaces within the vehicle, sensing at lower rates tends to provide a filtering effect such that spurious movements or signals bouncing from surfaces other than the occupant, are not interpreted to be indicative of the distance between the occupant and the sensor.

In some situations, the sensor 46 may sense certain movements of the occupant 22, such as waving a hand or a newspaper, which should not be interpreted to be indicative that the occupant 22 is close to the air bag assembly 32. Such occupant movements are referred to herein as spurious movements. Control of the air bag 36 is not in response to such spurious movements via the benefits of the filtering effect.

Referring to again to FIG. 5, the first frequency ultrasonic signal 52 (designated S1 in FIG. 5) is emitted at time 0. In the example, the S1 signal reflects from a surface located 40.8 inches away from the sensor 46. The S1 echo returns to the receiver 6 ms after emission of the S1 signal. However, since the preset time period of emission is 5 ms, the second frequency ultrasonic signal (designated S2 in FIG. 5), is emitted prior to the reception of the S1 echo. As a result, the S1 echo is "late" by 1 ms; that is, the time-of-flight is 1 ms longer than the preset time interval of 5 ms.

The S2 signal also reflects from the surface located 40.8 inches away from the sensor 46. The S2 echo returns to the receiver 6 ms after the emission of the S2 signal, that is, at 11 ms. Thus, the S2 echo is also "late" by 1 ms; that is, the time-of-flight is 1 ms longer than the preset time interval of 5 ms.

As illustrated in FIG. 5, at 6 ms, the first bandpass filter 102 allows the signal portion associated with the S1 echo to pass without a significant reduction in amplitude (solid curve identified BP1). In contrast, the second bandpass filter 104, reduces the amplitude of the signal portion of the S1 echo to below a certain level (dashed curve identified BP2).

On the other hand, at 11 ms, the second bandpass filter 104 allows the signal portion associated with the S2 echo to pass without a significant reduction in amplitude (solid curve identified BP2). In contrast, the first bandpass filter 102 reduces the amplitude of the signal portion of the S2 echo to below a certain level (dashed curve identified BP1).

Figure 6:
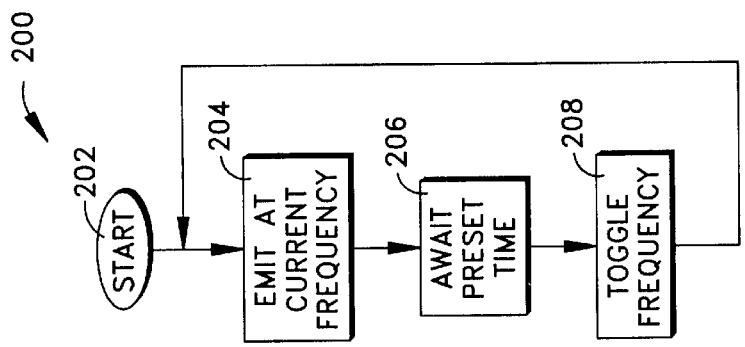
FIG. 6 is a flowchart diagram showing a process for emitting signals and receiving return echoes for the embodiments of FIGS. 2 and 3.

One embodiment of a process 200 performed by the controller 60, in accordance with the present invention, is shown in FIG. 6. The process 200 is initiated at step 202 and proceeds to step 204. At step 204, the controller 60 (e.g., via driver 70) actuates the sensor 46 so that the first frequency ultrasonic signal 52 is emitted. At step 206, the controller 60 runs an internal counter to count up to a preset time period (e.g., 5 ms) corresponding to the rate of the signal emission at alternating frequencies. At step 208, the controller 60 toggles the frequency (e.g., via frequency select function portion 72). The process 200 then loops back to step 204 and emits the second frequency signal.

Figure 7:
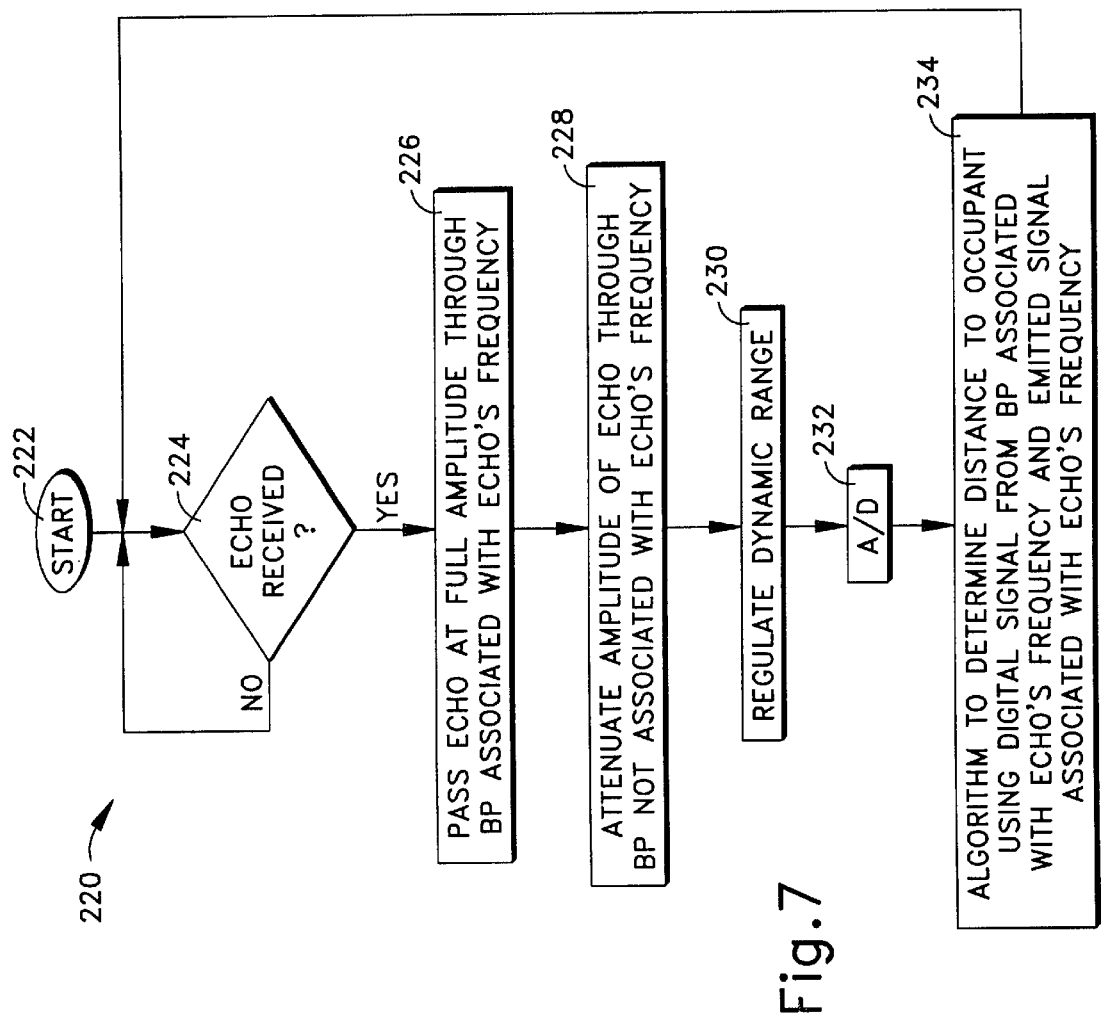
FIG. 7 is a flowchart diagram showing a process for processing the return signals for the embodiments of FIGS. 2 and 3.

A receiving echo process 220 (FIG. 7) is initiated at step 222 and proceeds to step 224. At step 224, the process 220 waits until an echo (e.g., 56) is received. When an echo is received, the process 220 proceeds to step 226. At step 226, the echo (e.g., 56) is passed at its full amplitude through the bandpass filter (e.g., 102) at the frequency associated with the return echo's frequency. At step 228, the process 220 passes the echo (e.g., 56) through the bandpass filter (e.g., 104) not associated with the return echo's frequency where the amplitude of the echo (e.g., 56) is attenuated to below a certain level.

The process 220 proceeds to step 230. At step 230, the process 220 regulates the dynamic range of the output signals from each bandpass filter 102, 104. Dynamic range regulation is needed to ensure that the signals can later be converted to digital without loss of information. The process 220 proceeds to step 232 where the output signals from the each bandpass filter 102, 104 are converted to digital signals.

After step 232, the process 220 processes the digital output signal at full amplitude and disregards the attenuated digital output signal. At step 234, the process 220 performs an algorithmic procedure whereby it associates the return echo received with the signal emitted at the same frequency. The process 220 then determines the time-of-flight between the signal's emission and the reception of the associated return echo, and then determines the distance between the occupant 22 and the air bag assembly 32. The process 220 then loops back to step 224.

If it becomes necessary to significantly improve the dynamic range of the apparatus 28, using "on the fly calibrations" can reduce the error in gain. This involves applying short low voltage predetermined pulse sequences to the sensor 46 at predetermined intervals. The voltage would be low enough so it does not produce a measurable echo.

The predetermined pulse sequence would comprise of a sequence of calibration pulses at successive frequencies across the bandwidths of the two bandpass filters 102, 104. By comparing the input pulse sequence to the output of each bandpass filter 102, 104, it is then possible to precisely compute the transfer function of each bandpass filter 102, 104 channel.

By applying a sequence of low amplitude calibration pulses to the sensor 46 at several frequencies across the input of each bandpass filter 102, 104, the transfer function can also reflect the frequency dependent sensitivity of the sensor 46 across the bandwidths of the two bandpass channels. Triggering the sensor 46 to "ring" for a short period after an excitation performs this function. The duration and amplitude of this ring is dependent on the sensor's 46 sensitivity at the applied frequency.

The calibration pulse sequences are applied at single frequencies stepped through the frequency regions of each filter's 102, 104 passbands. The amplitude in each passband output is then measured at a point just before the end of the excitation. These amplitudes give the amplitude transfer function for the applied frequency at each channel. At a predetermined time after the excitation pulse, the amplitudes in the two channels are measured again at a different frequency step. These amplitudes give the combined channel transfer function and transducer sensitivity function at the applied frequency.

From these measurements, it is then possible to extract the channel transfer and sensitivity functions. The transfer function is extracted by analyzing each bandpass filter 102, 104 channel output during calibration pulse sequence excitations. The sensitivity transfer function in the frequency regions of the two bandpass filter 102, 104 channels is determined by analyzing the ring-down response. As a result, this calibration allows calculating and applying the appropriate scaling factors accounting for the amount of rejection between the passbands.

Figure 9:
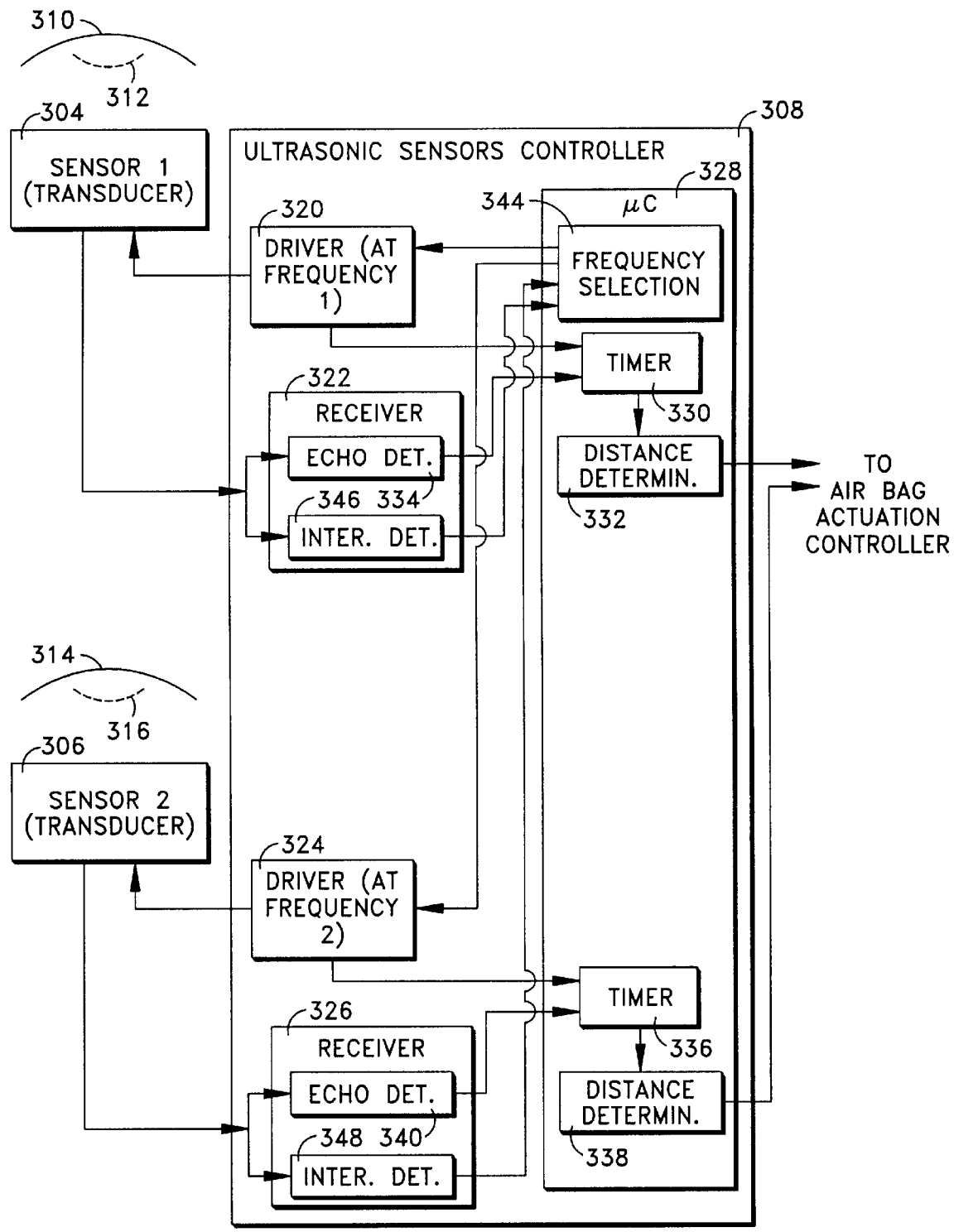
FIG. 9 is a function block diagram of the occupant sensing system of FIG. 8.

More than one sensor may be used as an alternative to the single sensor 46 of the embodiments associated with FIG. 1 (i.e., the embodiment shown in FIG. 2 and the embodiment shown FIG. 3). This feature is exemplified in the embodiment of FIGS. 8 and 9. In FIG. 8 an occupant protection system 300 is shown with many of the same structural feature and in the same environment as the occupant protection system 20 of FIG. 1. Accordingly, identical elements are identified by the same reference numbers and are not specifically discuss herein.

The significant difference for the embodiment of FIG. 8 is that an apparatus 302 has two sensors 304 and 306 and a sensors controller 308 configured for the two sensors. The first of such sensors 304 transmits and receives at ultrasonic signals 310, 312 (FIG. 9) at the first frequency and the second sensor transmits and receives ultrasonic signals 314, 316 at the second, different frequency. The first sensor 304 is located in the instrument panel 34, and the second sensor is located in the headliner 48. Accordingly, the first and second sensors 304 and 306 enable distance determinations and thus occupant location characteristic determinations from two reference points. However, the benefits of avoiding signal confusion and avoiding miscalculation of distance due to late echoes are provided similar to the other embodiments.

Within the controller 308 (FIG. 9), a first driver 320 and a first receiver 322 are provided for the first sensor 304, and a second driver 324 and a second receiver 326 are provided for the second sensor 306. Within a microcomputer 328 of the controller 308 a timer function portion 330 and a distance determination function portion 332 are provided and are associated with the first sensor 304. An echo detection function portion 334 of the first receiver 322 is connected to the timer function portion 330. Similarly, a timer function portion 336 and a distance determination function portion 338 are provided and are associated with the second sensor 306. An echo detection function portion 340 of the second receiver 326 is connected to the timer function portion 336.

A frequency select function portion 344 of the microcomputer 328 is connected to the first and second drivers 320 and 324, is connected to an interference detection function portion 346 at the first receiver 322, and is connected to an interference detection function portion 348 at the second receiver 326. The frequency select function portion 344 may operate similar to the frequency select function portion 72 of the apparatus 28 shown in FIG. 1. For example, the frequency select function portion 344 may make determinations regarding sensor use based upon interference at a certain frequency. Also, the frequency select function portion 344 may control the emissions of the two frequency signals to have a predetermined sequence. For example, the first and second signals may alternately be emitted.

Although the foregoing has been applied to a vehicle occupant protection system, various modifications and changes thereto can be made by persons skilled in the art to apply the foregoing to automotive occupant detection, automotive backup warning, cameras for auto-focus, and obstacle detection in robots and automatic transports.

Although the foregoing has been a description and illustration of specific embodiments of the invention, various modifications and changes thereto can be made by persons skilled in the art without departing from the scope and spirit of the invention as defined by the following claims.

Having described the invention, the following is claimed:

1. An apparatus for determining a vehicle occupant location characteristic, said apparatus comprising:

means for echo ranging at a first ultrasonic frequency to determine a first time-of-flight to an occupant seating position;

means for echo ranging at a second ultrasonic frequency, different from said first ultrasonic frequency, to determine a second time-of-flight to the occupant seating position; and means for determining the occupant location characteristic using at least one of the determined times-of-flight, said means for echo ranging at the first frequency including means for emitting a first ultrasonic signal at the first frequency toward the occupant seating position, means for receiving a return echo of the first signal, and means for determining time duration between emission of the first signal and reception of the first signal echo, and said means for echo ranging at the second frequency including means for emitting a second ultrasonic signal at the second frequency toward the occupant seating position, means for receiving a return echo of the second signal, and means for determining time duration between emission of the second signal and reception of the second signal echo, said means for emitting the first ultrasonic signal including a transducer operating at a resonant frequency of said transducer, the resonant frequency being the first frequency, and said means for emitting the second ultrasonic signal including said transducer operating at a first harmonic frequency of said transducer, the first harmonic frequency being the second frequency.

2. A method for determining a vehicle occupant location characteristic, said method comprising the steps of:

echo ranging at a first ultrasonic frequency to determine a first time-of-flight to an occupant seating position;

echo ranging at a second ultrasonic frequency, different from said first ultrasonic frequency, to determine a second time-of-flight to the occupant seating position; and determining the occupant location characteristic using at least one of the determined times-of-flight, wherein said step of echo ranging at the first frequency includes emitting a first ultrasonic signal at the first frequency toward the occupant seating position, receiving a return echo of the first signal, and determining time duration between emission of the first signal and reception of the first signal echo, and said step of echo ranging at the second frequency includes emitting a second ultrasonic signal at the second frequency toward the occupant seating position, receiving a return echo of the second signal, and determining time duration between emission of the second signal and reception of the second signal echo, and wherein said step of emitting the first ultrasonic signal includes operating a transducer at a resonant frequency of the transducer, the resonant frequency being the first frequency, and said step of emitting the second ultrasonic signal includes operating the transducer at a first harmonic frequency of the transducer, the first harmonic frequency being the second frequency.

3. A method as set forth in claim 2, wherein said step of echo ranging at the first ultrasonic frequency includes emitting a first ultrasonic signal at the first ultrasonic frequency toward the occupant seating position, receiving a first return echo of the first ultrasonic signal, and determining time duration between emission of the first ultrasonic signal and reception of the first return echo, and said step of echo ranging at the second ultrasonic frequency includes emitting a second ultrasonic signal at the second frequency toward the occupant seating position, receiving a second return echo of the second ultrasonic signal, and determining time duration between emission of the second ultrasonic signal and reception of the second return echo.

4. A method as set forth in claim 2, including controlling the emission of the first ultrasonic signal and the emission of the second ultrasonic signal to cause emission of the second ultrasonic signal subsequent to emission of the first ultrasonic signal and prior to reception of the first signal echo and to cause emission of a subsequent first ultrasonic signal subsequent to emission of the second ultrasonic signal and prior to reception of the second signal echo.

5. A method as set forth in claim 2, wherein said step of determining the occupant location characteristic using at least one of the determined distances is associated with one of the first and second frequencies, said method includes monitoring interference at the other of the first and second frequencies.

6. A method as set forth in claim 2, wherein said step of determining the occupant location characteristic includes determining a distance to an occupant as the occupant location characteristic.

7. An apparatus for determining a vehicle occupant location characteristic, said apparatus comprising:

a sensor having transmitter means and receiver means, said transmitter means for repeatedly transmitting first and second ultrasonic signals, said second ultrasonic signal having a frequency that is different from a frequency of said first ultrasonic signal, said second ultrasonic signal being transmitted at a predetermined time interval after transmission of said first ultrasonic signal, said receiver means for receiving first and second return echoes of the first and second ultrasonic signals, respectively;

means for differentiating said first return echo from said second return echo;

means for determining a time-of-flight of one of said first and second ultrasonic signals; and means for calculating the vehicle occupant location characteristic using the determined time-of-flight, said transmitter means for emitting the first ultrasonic signal including a transducer operating at a resonant frequency of said transducer, the resonant frequency being the frequency of the first ultrasonic signal, and said transmitter means for emitting the second ultrasonic signal includes said transducer operating at a first harmonic frequency of said transducer, the first harmonic frequency being the frequency of the second ultrasonic signal.

8. An apparatus for determining a vehicle occupant location characteristic, said apparatus comprising:

a sensor having transmitter means and receiver means, said transmitter means for repeatedly transmitting first and second ultrasonic signals, said second ultrasonic signal having a frequency that is different from a frequency of said first ultrasonic signal, said second ultrasonic signal being transmitted at a predetermined time interval after transmission of said first ultrasonic signal, said receiver means for receiving first and second return echoes of the first and second ultrasonic signals, respectively;

means for differentiating said first return echo from said second return echo;

means for determining a time-of-flight of one of said first and second ultrasonic signals; and means for calculating the vehicle occupant location characteristic using the determined time-of-flight, said transmitter means for emitting the first ultrasonic signal including a transducer operating at a first resonant frequency of said transducer, the first resonant frequency being the frequency of the first ultrasonic signal, and said transmitter means for emitting the second ultrasonic signal includes said transducer operating at a second resonant frequency of said transducer, the second resonant frequency being the frequency of the second ultrasonic signal.

9. An apparatus as set forth in claim 8, including means for controlling said transmitter means for emitting the first ultrasonic signal and for emitting the second ultrasonic signal to cause emission of the second ultrasonic signal subsequent to emission of the first ultrasonic signal and prior to reception of the first signal echo and to cause emission of a subsequent first ultrasonic signal subsequent to emission of the second ultrasonic signal and prior to reception of the second signal echo.

10. An apparatus as set forth in claim 8, wherein said means for calculating the vehicle occupant location characteristic includes means for determining a distance to an occupant as the occupant location characteristic.

11. An apparatus for determining a vehicle occupant location characteristic, said apparatus comprising:

a sensor having transmitter means and receiver means, said transmitter means for repeatedly transmitting first and second ultrasonic signals, said second ultrasonic signal having a frequency that is different from a frequency of said first ultrasonic signal, said second ultrasonic signal being transmitted at a predetermined time interval after transmission of said first ultrasonic signal, said receiver means for receiving first and second return echoes of the first and second ultrasonic signals, respectively;

means for differentiating said first return echo from said second return echo;

means for determining a time-of-flight of one of said first and second ultrasonic signals; and means for calculating the vehicle occupant location characteristic using the determined time-of-flight, said means for calculating the vehicle occupant location characteristic using the determined time-of-flight being associated with one of the first and second frequencies, said apparatus including means for monitoring interference at the other of the first and second frequencies.

12. A method for determining a vehicle occupant location characteristic, said method comprising the steps of:

echo ranging at a first ultrasonic frequency to determine a first time-of-flight to an occupant seating position;

echo ranging at a second ultrasonic frequency, different from said first ultrasonic frequency, to determine a second time-of-flight to the occupant seating position; and determining the occupant location characteristic using at least one of the determined times-of-flight, said step of echo ranging at the first ultrasonic frequency includes emitting a first ultrasonic signal at the first ultrasonic frequency toward the occupant seating position, receiving a first return echo of the first ultrasonic signal, and determining time duration between emission of the first ultrasonic signal and reception of the first return echo, and said step of echo ranging at the second ultrasonic frequency includes emitting a second ultrasonic signal at the second ultrasonic frequency toward the occupant seating position, receiving a second return echo of the second ultrasonic signal, and determining time duration between emission of the second ultrasonic signal and reception of the second return echo, step of emitting the first ultrasonic signal includes operating a transducer at a first resonant frequency of the transducer, the first resonant frequency being the first frequency, and said step of emitting the second ultrasonic signal includes operating the transducer at a second resonant frequency of the transducer, the second resonant frequency being the second frequency.

* * * * *